United States Patent [19]
Boone

[11] Patent Number: 5,312,149
[45] Date of Patent: May 17, 1994

[54] TAILGATE ENCLOSED TELESCOPIC RAMP STRUCTURE

[75] Inventor: Frank J. Boone, Owensboro, Ky.

[73] Assignee: Better Ideas, Inc., Owensboro, Ky.

[21] Appl. No.: 123,239

[22] Filed: Sep. 20, 1993

[51] Int. Cl.$^5$ ............................................. B62D 33/03
[52] U.S. Cl. ........,............................ 296/61; 414/537
[58] Field of Search .................. 296/50, 51, 57.1, 61, 296/62; 414/537; 280/166

[56] References Cited

U.S. PATENT DOCUMENTS

| | | | |
|---|---|---|---|
| 2,783,080 | 2/1957 | Ringsby | 296/50 |
| 3,642,156 | 2/1972 | Stenson | 214/85 |
| 3,976,209 | 8/1976 | Burton | 214/85 |
| 4,601,632 | 7/1986 | Agee | 296/61 X |
| 4,624,619 | 11/1986 | Uher | 296/61 X |
| 4,685,857 | 8/1987 | Goeser et al. | 296/61 X |
| 4,864,673 | 9/1989 | Adaway et al. | 296/61 X |
| 4,944,546 | 7/1990 | Keller | 296/61 |
| 4,990,049 | 2/1991 | Hargrove | 296/61 X |
| 5,133,584 | 7/1992 | McCleary | 296/61 |
| 5,205,603 | 4/1993 | Burdette | 280/166 X |
| 5,244,335 | 9/1993 | Johns | 296/61 X |

*Primary Examiner*—David M. Mitchell
*Assistant Examiner*—Gary C. Hose
*Attorney, Agent, or Firm*—Jacobson, Price, Holman & Stern

[57] ABSTRACT

A conventional pickup truck equipped with a tailgate for closing the rear end of the load bed of the pickup truck is provided and the upper margin of the hollow tailgate is provided with at least one elongated slot extending along the upper margin from which a loading ramp structure consisting of at least three telescopically engaged ramp sections may be extended and disposed at a rearwardly and downwardly inclined position when the tailgate is in its horizontally rearwardly projecting position, the telescopically engaged ramp sections including an outer wide ramp section, at least one intermediate and somewhat narrower ramp section and an inner narrow ramp section with the ramp sections inwardly of the outer wide ramp section being progressively narrower in width and thickness toward the innermost narrow ramp section. The smaller transverse area of the inner ramp section received through the slot in the free margin of the tailgate enabling the inner end of the narrow ramp section to be rearwardly and downwardly inclined relative to the tailgate when the latter is in its rearwardly projecting position without interference with the opposite side edges of the slot in which the ramp structure may be telescopically received, the outer wide ramp section being snugly received in the slot when the ramp structure is in the fully retracted position.

6 Claims, 2 Drawing Sheets

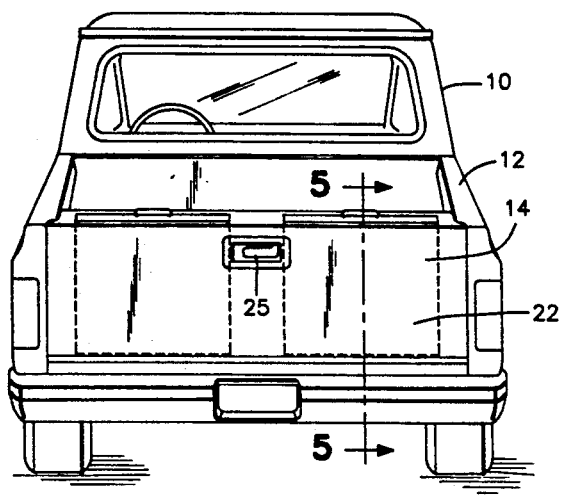
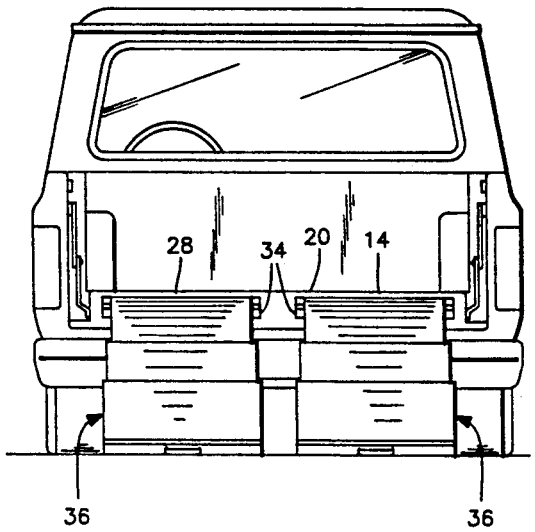
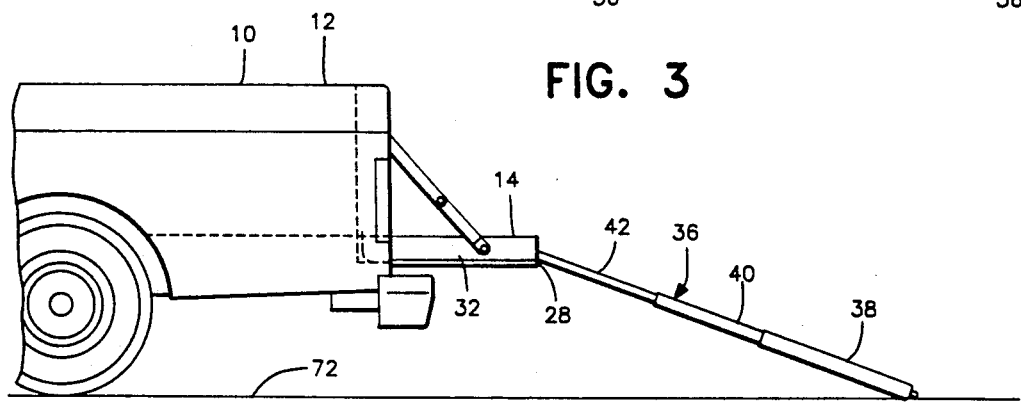
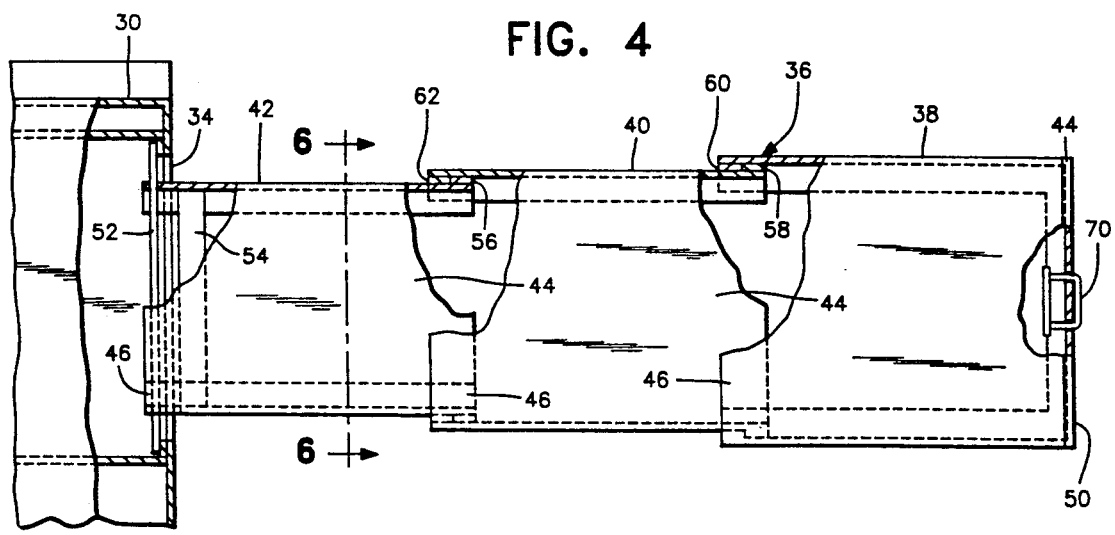

TAILGATE ENCLOSED TELESCOPIC RAMP STRUCTURE

BACKGROUND OF THE INVENTION

1. Field of the Invention

This invention relates to a ramp structure for assisting in loading the load bed of a pickup truck and wherein a pair of longitudinally extendable and retractable ramp structures are mounted within the free swinging edge of the tailgate of the pickup truck for extension and retraction relative to the tailgate when the latter is in the lowered horizontally and rearwardly projecting position.

2. Description of Related Art

Various different forms of pivoted, folding and sliding loading ramps have been associated with the rear ends of truck type vehicles and include ramp structures which have been supported entirely or in part from the tailgate of a pickup truck-type vehicle.

Examples of these previously known forms of ramps or ramp structures are disclosed in U.S. Pat. Nos. 2,783,080, 3,642,165, 3,976,209, 4,944,546 and 5,133,584. However, those structures operatively associated with a pickup truck load bed tailgate have not been of a type wherein the ramp structure may be totally enclosed within the tailgate when in a stored inoperative position.

SUMMARY OF THE INVENTION

The load ramp structure of the instant invention incorporates a pair of ramp structures each including three elongated and relatively longitudinally telescopically engaged ramp sections. The free swinging margin of the associated tailgate includes a pair of elongated slots or openings formed therein and spaced apart longitudinally of the free swinging margin of the tailgate and through which the two tailgate ramp structures may be extended and retracted. Each of the ramp structures includes a first wide section, a narrow section and at least one intermediate size intermediate section disposed between the wide and narrow sections with each section of the ramp structure from the wide section thereof to the narrow section thereof being progressively smaller in width and also smaller in thickness such that the multiple sections of the ramp structure may be at least substantially fully telescopingly engaged with each other with the wide section disposed outermost and the narrow section disposed innermost.

In addition, each ramp section includes an outer end and an inner end and the inner end of the narrow ramp section includes abutment structure operatively associated with adjacent closed portions of the free margin of the associated tailgate on opposite sides of the associated ramp structure receiving slot for preventing full withdrawal of the narrow ramp section from the tailgate, the wide ramp section being the rearmost section when the tailgate is in the horizontal position and the ramp structure is fully extended and inclined downwardly toward engagement with the ground from which the associated pickup is supported.

By having the narrow section (and thinner section) comprising the section which is prevented from full extension from the free swinging margin of the tailgate and the wider and thicker section as the rearmost section of the ramp structure, ample clearance is assured between the narrow and thinner forward section and associated tailgate slot sides to allow angular displacement of the narrow tailgate section such that the ramp structure may be inclined rearwardly and downwardly toward the ground while still allowing reasonably tight fitting of the tailgate construction within the associated free margin tailgate slot when the ramp structure is in its fully retracted position, the wider and thicker ramp structure section substantially filling the cross sectional area of the associated tailgate free margin slot.

The main object of this invention is to provide a pickup truck tailgate or the like with a fully retractable ramp structure capable of facilitating the loading of a pickup truck load bed by movement of the load to be received by the tailgate upwardly along a ramp structure, across a lowered tailgate of the pickup truck and into the pickup truck load bed.

Another object of this invention is to provide a collapsible tailgate ramp structure in accordance with the preceding object which may be readily incorporated into the manufacturer of new pickup truck tailgates and the like.

Still another important object of this invention is to provide a ramp structure incorporating a pair of laterally spaced apart narrow ramps which may be used conveniently to load wheeled vehicles and the like onto the pickup truck, or which may be used singly in more confined areas as a ramp structure for facilitating the loading of other objects onto the associated pickup truck load bed.

A final object of this invention to be specifically enumerated herein is to provide a tailgate enclosed telescopic ramp structure in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a rear perspective view of a typical form of pickup truck illustrating the tailgate of the load bed thereof in a closed position and the ramp structure of the instant invention in a fully retracted position;

FIG. 2 is a rear elevational view of the pickup truck with the tailgate thereof in a lowered rearwardly projecting position and the ramp structure of the instant invention in a fully extended rearwardly and downwardly inclined position;

FIG. 3 is a fragmentary elevational view of the rear portion of the assemblage illustrated in FIG. 2 as seen from the left side thereof;

FIG. 4 is an enlarged plane view of the rear portion of the tailgate illustrated in FIG. 3 and one of the ramp structures in a fully extended position, parts of the tailgate and ramp structure being broken away and illustrated in horizontal sections;

DESCRIPTION OF THE PREFERRED EMBODIMENT

Referring now more specifically to the drawings the numeral 10 generally designates a typical form of pickup truck including a load bed 12 whose rear end is removably closable through the utilization of a pivotally mounted tailgate 14.

Figure 5:
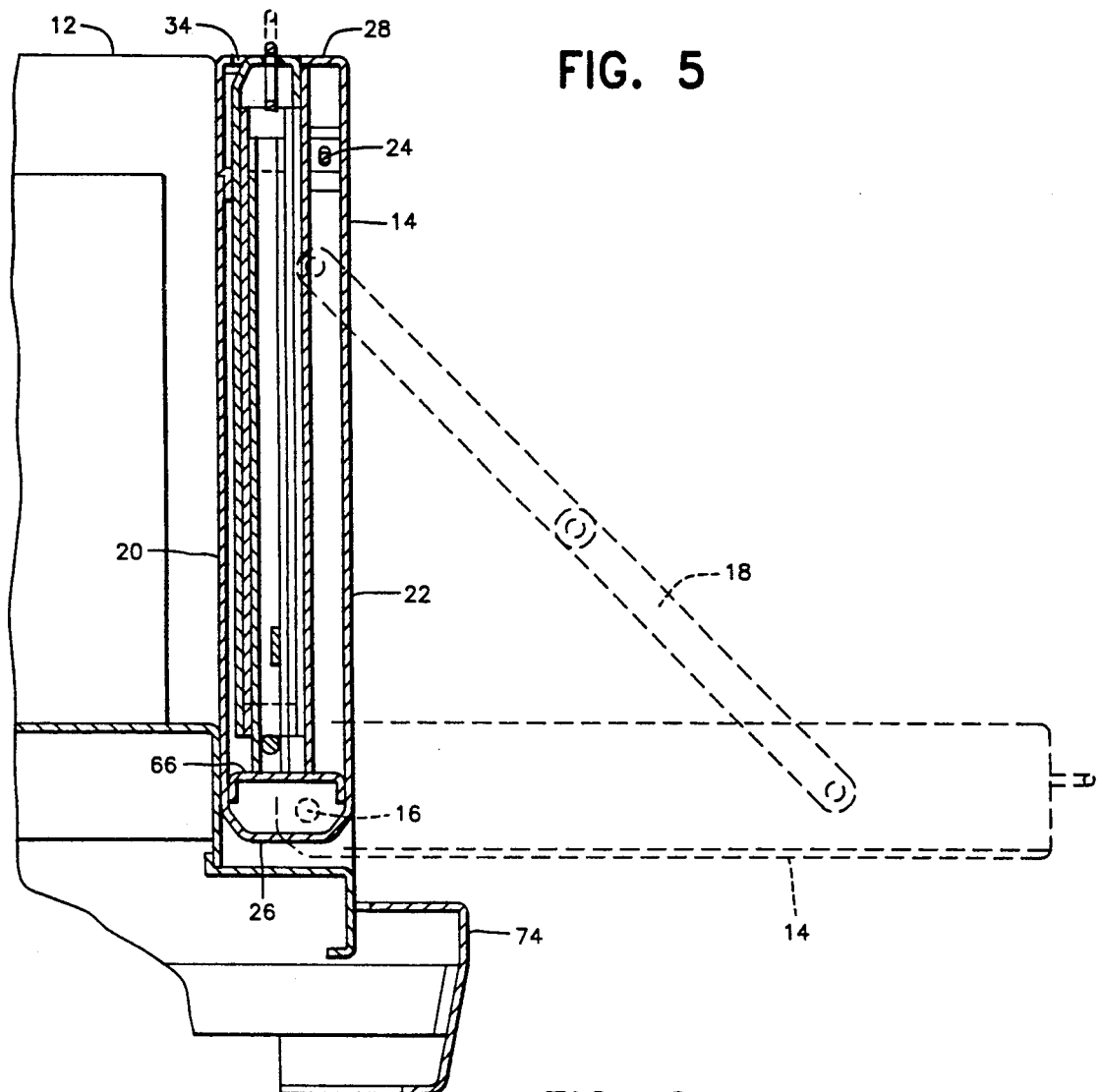
FIG. 5 is an enlarged fragmentary vertical sectional view taken substantially upon the plane indicated by the section line 5—5 of FIG. 1 and with a lowered position of the tailgate illustrated in phantom lines.
Figure 6:
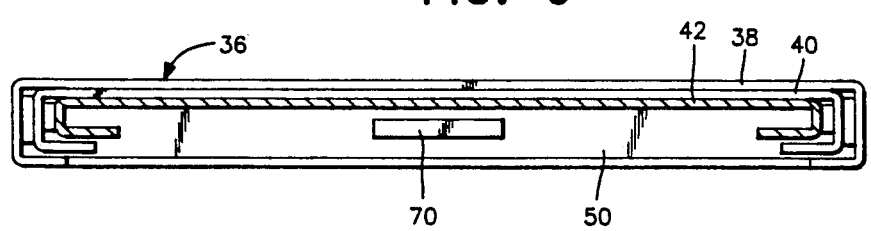
FIG. 6 is an enlarged vertical sectional view taken substantially upon the plane indicated by the section line 6—6 of FIG. 4.
Figure 7:
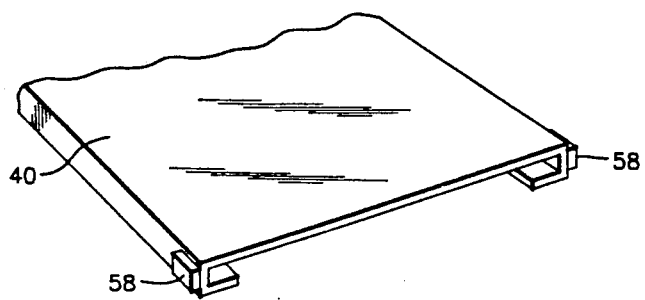
FIG. 7 is a fragmentary perspective view of the rear portion of one of the intermediate ramp structure sections.

As may best be seen from FIG. 5 of the drawings the tailgate 14 is pivotally mounted from the load bed 12 as at 16 for swinging between an upright closed position closing the rear end of the load bed 12 as shown in solid lines in FIG. 5 and a horizontal rearwardly projecting open position as shown in phantom lines in FIG. 5. Further, the tailgate 14 includes pivoted bracing 18 connected between the tailgate 14 and the load bed 12 for support of the tailgate 14 when the latter has been swung to its rearwardly projecting open position.

The tailgate 14 is hollow and includes front and rear spaced panels 20 and 22 between which the tailgate latching mechanism 24 is disposed, the latching mechanism including a center operator 25 recessed in the rear panel 22 of the tailgate 14. Further, the tailgate includes a base margin 26 adjacent the pivot connection as at 16 and a free swinging margin 28, the margins 26 and 28 being interconnected by opposite side margins 30 and 32 extending therebetween.

The telescopic ramp structure of the instant invention includes a pair of elongated longitudinally spaced slots 34 formed in and opening outwardly of the margin 28. Each of the slots 34 has a longitudinally extendable and retractable ramp assembly referred to in general by the reference numeral 36 operatively associated therewith. Each ramp structure 36 includes first, second and third wide, intermediate and narrow ramp sections, respectively, and each ramp section comprises a C-shaped channel member. The sections 38, 40 and 42 are not only progressively narrower as measured transversely of the corresponding ramp structure 36, but they are also progressively thinner as measured vertically. This enables the sections 38, 40 and 42 to be lengthwise telescopingly engaged with each other. Furthermore, each ramp section 38, 40 and 42 includes, as viewed in FIG. 4, an outer end 44 projecting rearwardly of the load bed and tailgate 14 and an inner end 46 which faces forwardly. The outer ends of the sections 40 and 42 are open as illustrated, but they may be closed, if desired.

The outer end of the ramp section 38 is closed by an outer end wall 50 and each of the inner ends 46 of the sections 38, 40 and 42 is open, the inner end of the section 42 including a transverse abutment bar 52 supported therefrom which is of a length greater than the length of the corresponding slot 34 and is therefore engageable with the inner surface of the free end wall of the tailgate 14 comprising the free margin 28 in order to prevent full longitudinal displacement of the narrow ramp section 42 outwardly of the corresponding slot or opening 34. In addition, the narrow ramp section 42 includes a transverse brace 54 extending between opposite sides of the open side of the channel member represented thereby.

The outer ends of the ramp sections 40 and 42 include outer side abutments 56 and 58 and the inner ends of the ramp sections 38 and 40 include inside opposite side abutments 60 and 62 disposed inwardly of the abutments 58 and 56, respectively. Accordingly, the abutments 56, 62 and 58, 60 limit extension of the section 40 relative to the section 42 and extension of the section 38 relative to the section 40, respectively. Otherwise, as may be seen from FIG. 5 of the drawings, the section 40 may be substantially fully telescoped within the section 38 and the section 42 may be substantially fully telescoped within the section 40, the interior of the tailgate 14 including a transverse brace or abutment member 66 with which the inner end 46 of the section 42 is engageable to limit retraction of the section 42 within the tailgate slot 28 and the inner ends 46 of the sections 40 and 38 being engageable with the transverse bar or abutment 52 to limit telescoping engagement of the section 42 into the section 40 and telescoping retraction of the section 40 into the section 38.

When the sections 38, 40 and 42 are fully telescoped relative to each other and the section 42 is fully telescoped within the tailgate 14, the outer end wall 50 is substantially flush with the free end wall 28 of the tailgate 14, the section 38 including a U-shaped handle 70 extendable and retractable relative to the outer end wall 50.

As hereinbefore set forth, the narrow ramp section 14 is thinner than the wide ramp section 38 and the latter, when the ramp structure 36 is fully recessed within the tailgate 14, substantially occupies the full cross sectional area of the corresponding slot 34. Hence, when the narrower and thinner section 42 is fully extended in the manner illustrated in FIG. 4, there is sufficient clearance between the narrow section 42 and the opposite longitudinal sides of the corresponding slot to enable the section 42 to be inclined rearwardly and downwardly in the manner illustrated in FIG. 3 such that the ramp structure 36 may bridge between the free margin 28 of the tailgate 14 and the ground 72 upon which the pickup truck 10 rests.

If desired, both of the ramp structures 36 may be operationally deployed in the manner illustrated in FIG. 2 of the drawings in order that a vehicle with opposite side wheels may be rolled up the two ramp structures 36. Conversely, if the area rearward of the open tailgate 14 is partially obstructed and only a narrow ramp structure 36 is needed, only one of the ramp structures 36 need be operationally deployed.

If it is desired, the outer end wall 50 of the wide ramp structure 38 may be increased in plan area so as to overlap entirely the corresponding slot 34 and prevent the entrance of precipitation into the interior of the tailgate 14. However, most tailgates are now made of rust resistant material and include drain openings whereby moisture may be drained from there within.

Another advantage of having the ramp structures 36 increase in width rearwardly as opposed to decreasing in width rearwardly is that a four wheeled vehicle may be more readily aligned with and moved up the ramp structures 36 for loading in the load bed 10. Of course, once a four wheeled vehicle or the like is loaded into the load bed 12, it is already properly aligned with the ramp structures 36 and may be readily unloaded from the load bed 12. Thus, it is more important to have the outer lower ends of the ramp structures 36 wider than to have the upper ends of the ramp structures wider than the lower ends.

The pivoted braces 18 may be disengaged on some pickup trucks and the corresponding tailgates 14 may swing downward further than that illustrated in FIG. 5 and rest upon the bumper 74 of the pickup truck 10 if desired. In such instance, the inclination of the ramp structure 36 may be reduced accordingly when the ramp structure is fully deployed.

The foregoing is considered as illustrative only of the principals of the invention. Further, since numerous modifications and changes readily will occur to those skilled in the art, it is not desired to limit the invention to the exact construction and operation shown and described, and accordingly, all suitable modifications and equivalence may be resorted to, falling within the scope of the invention.

What is claimed as new is as follows:

1. In combination with a vehicle load bed having front and rear end portions and a hollow tailgate including an upper free margin and lower base margin and pivotally supported from said load bed rear end portion for swinging about an axis closely adjacent and paralleling said lower margin and extending transversely of said load bed between a first upstanding position closing the rear end portion of said load bed and a second horizontal rearwardly projecting position forming a rearward extension of the rear end portion of said load bed, said free margin including at least one elongated slot formed in and extending along said free margin, a ramp structure, said ramp structure including wide and narrow ramp sections and at least one intermediate ramp section with said wide, intermediate and narrow ramp sections being progressively smaller in width and thickness from said wide ramp section to said narrow ramp section and telescopically engaged with each other for substantially full telescopic engagement of said intermediate and narrow ramp sections within said wide section and limited extension of said intermediate and narrow sections relative to said wide section, said ramp sections including outer and inner ends, said inner end of said narrow section and said free margin including coacting abutment structure preventing outward extension of said inner end of said narrow section relative to said free margin, said wide section, when said sections are retracted relative to each other, being retractable at least substantially fully within said slot, the narrower and thinner ramp section defining a cross sectional area appreciably less than the cross sectional area of said slot, whereby said narrow section, when extended to its limit position relative to said slot, may be angulated rearwardly and downwardly relative to the free margin of said tailgate independent of binding with the opposite longitudinal sides of said slot.

2. The combination of claim 1 wherein said sections are generally C-channel shaped in transverse cross section and the outer ends of said narrow and intermediate sections include first abutment means coacting with second abutment means carried by the inner ends of said outer and intermediate sections limiting extension of said intermediate and outer extension relative to said inner and intermediate sections.

3. The combination of claim 1 wherein the outer end of said wide section includes a retractable handle.

4. The combination of claim 1 wherein said free margin of said tailgate includes a pair of said elongated slots formed therein and spaced longitudinally therealong, and a second ramp structure corresponding to the first mentioned ramp structure operatively associate with said second slot.

5. The combination of claim 4 wherein the outer end of said wide section includes a retractable handle.

6. The combination of claim 1 wherein said sections are generally C-channel shaped in transverse cross section and the outer ends of said narrow and intermediate sections include first abutment means coacting with second abutment means carried by the inner ends of said outer and intermediate sections limiting extension of said intermediate and outer extension relative to said inner and intermediate sections, said channel shaped ramp sections opening laterally downwardly when said ramp structure is in an extended position relative to said tailgate.

* * * * *